US010165207B2

United States Patent
Lee

(10) Patent No.: US 10,165,207 B2
(45) Date of Patent: Dec. 25, 2018

(54) IMAGE PROCESSING APPARATUS AND IMAGE PROCESSING SYSTEM

(71) Applicant: SAMSUNG ELECTRONICS CO., LTD., Suwon-si, Gyeonggi-Do (KR)

(72) Inventor: Jee-Hong Lee, Seoul (KR)

(73) Assignee: SAMSUNG ELECTRONICS CO. LTD., Suwon-si, Gyeonggi-Do (KR)

( * ) Notice: Subject to any disclaimer, the term of this patent is extended or adjusted under 35 U.S.C. 154(b) by 149 days.

(21) Appl. No.: 15/346,181

(22) Filed: Nov. 8, 2016

(65) Prior Publication Data

US 2017/0180656 A1 Jun. 22, 2017

(30) Foreign Application Priority Data

Dec. 16, 2015 (KR) .................. 10-2015-0180191

(51) Int. Cl.
*H04N 5/357* (2011.01)
*H04N 5/247* (2006.01)
(Continued)

(52) U.S. Cl.
CPC .............. *H04N 5/357* (2013.01); *G06T 1/20* (2013.01); *G06T 3/403* (2013.01); *G06T 3/4015* (2013.01); *H04N 5/217* (2013.01); *H04N 5/2258* (2013.01); *H04N 5/247* (2013.01); *H04N 5/3765* (2013.01); *H04N 9/045* (2013.01); *H04N 13/204* (2018.05); *G06T 2207/10021* (2013.01); *G06T 2207/10024* (2013.01); *G06T 2207/10028* (2013.01); *H04N 9/64* (2013.01)

(58) Field of Classification Search
CPC ................ H04N 5/2258; H04N 5/247; H04N 9/09–9/097; H04N 13/204; H04N 13/239; H04N 13/243; H04N 13/282; G06T 2207/10012; G06T 2207/10021; G06T 3/4007; G06T 3/4015; G06T 3/403; G06T 7/10; G06T 7/13; G06T 7/44; G06T 2207/20192; G06T 5/002; G06T 2207/20182
See application file for complete search history.

(56) References Cited

U.S. PATENT DOCUMENTS 6,288,742 B1 9/2001 Ansari et al.
7,724,284 B2 5/2010 Mentzer
(Continued)

*Primary Examiner* — Paul Berardesca
(74) *Attorney, Agent, or Firm* — F. Chau & Associates, LLC

(57) ABSTRACT

An image processing apparatus includes a pre-processor configured to generate information relating to image positions based on Bayer image signals obtained by cameras. The image processing apparatus further includes an independent image signal processor (IISP) configured to perform a first image signal processing operation for generating first image data of an RGB format from a first one of the Bayer image signals obtained by a first one of the cameras. The IISP is further configured to generate image processing information calculated during the first image signal processing operation. The image processing apparatus further includes a dependent image signal processor configured to perform a second image signal processing operation for generating second image data of the RGB format from a second one of the Bayer image signals obtained by a second one of the cameras using the image processing information and the information relating to the image positions.

20 Claims, 24 Drawing Sheets

(51) Int. Cl.
  *H04N 5/376* (2011.01)
  *H04N 5/217* (2011.01)
  *H04N 5/225* (2006.01)
  *H04N 13/204* (2018.01)
  *H04N 9/04* (2006.01)
  *G06T 3/40* (2006.01)
  *G06T 1/20* (2006.01)
  *H04N 9/64* (2006.01)

(56) References Cited

U.S. PATENT DOCUMENTS

| | | |
|---|---|---|
| 7,728,877 B2 | 6/2010 | Xin et al. |
| 8,154,610 B2 | 4/2012 | Jo et al. |
| 8,823,821 B2 | 9/2014 | Tian et al. |
| 2010/0045810 A1 | 2/2010 | Chun-Ru et al. |
| 2011/0310982 A1 | 12/2011 | Yang et al. |
| 2015/0042845 A1 | 2/2015 | Zhao |
| 2015/0055929 A1 | 2/2015 | Van Hoff et al. |

FIG. 8

| G11 | R12 | G13 | R14 | G15 |
|-----|-----|-----|-----|-----|
| B21 | G22 | B23 | G24 | B25 |
| G31 | R32 | G33 | R34 | G35 |
| B41 | G42 | B43 | G44 | B45 |
| G51 | R52 | G53 | R54 | G55 |

FIG. 11A

|     |     |     |     |     |
|-----|-----|-----|-----|-----|
| R11 | G12 | R13 | G14 | R15 |
| G21 | B22 | G23 | B24 | G25 |
| R31 | G32 | R33 | G34 | R35 |
| G41 | B42 | G43 | B44 | G45 |
| R51 | G52 | R53 | G54 | R55 |

FIG. 12A

IMAGE PROCESSING APPARATUS AND IMAGE PROCESSING SYSTEM

CROSS-REFERENCE TO RELATED APPLICATION

This application claims priority under 35 U.S.C. § 119 to Korean Patent Application No. 10-2015-0180191, filed on Dec. 16, 2015, in the Korean Intellectual Property Office, the disclosure of which is incorporated by reference herein in its entirety.

TECHNICAL FIELD

Exemplary embodiments of the present inventive concept relate to an apparatus and method for processing image signals, and more particularly, to an image processing apparatus and an image processing system.

DISCUSSION OF THE RELATED ART

Generally, in an image processing system including a plurality of cameras, image processors corresponding respectively to the cameras may individually perform a signal processing operation (e.g., a demosaicing operation and a denoising operation) on images obtained by the plurality of cameras. In the image processing system, when using image signal processors (ISPs) having the same quality specification for the respective cameras, costs of products may be high. In addition, when using ISPs with reduced quality specifications for some of the cameras, differences in resolution may occur among image signals generated by the respective cameras. Furthermore, the entire power consumption of the image processing system may be high.

SUMMARY

According to an exemplary embodiment of the present inventive concept, an image processing apparatus includes a pre-processor configured to generate information relating to image positions based on a plurality of Bayer image signals obtained by a plurality of cameras. The image processing apparatus further includes an independent image signal processor (IISP) configured to perform a first image signal processing operation for generating a first image data of an RGB format from a first one of the plurality of Bayer image signals obtained by a first one of the plurality of cameras. The IISP is further configured to generate image processing information calculated during the first image signal processing operation. The image processing apparatus also includes a dependent image signal processor (DISP) configured to perform a second image signal processing operation for generating a second image data of the RGB format from a second one of the plurality of Bayer image signals, obtained by a second one of the plurality of cameras using the image processing information and the information relating to the image positions.

According to an exemplary embodiment of the present inventive concept, an image processing system includes a plurality of cameras configured to generate a plurality of Bayer images. The image processing system further includes a pre-processor configured to generate information relating to image positions based on the plurality of Bayer image signals generated by the plurality of cameras. The image processing system additionally includes an independent image signal processor (IISP) configured to perform a first image signal processing operation for generating first image data of an RGB format from a first one of the plurality of Bayer image signals generated by a first camera from among the plurality of cameras. The IISP is further configured to generate image processing information calculated during the first image signal processing operation. The image processing system further includes a dependent image signal processor (DISP) configured to perform a second image signal processing operation for generating second image data of the RGB format from a second one of the plurality of Bayer image signals generated by a second camera from among the plurality of cameras using the image processing information and the information relating to the image positions. The image processing system additionally includes a timing controller configured to control output time points of the pre-processor, the IISP, and the DISP and a post-processor configured to post-process the first image data generated by the IISP and the second image data generated by the DISP.

According to an exemplary embodiment of the present inventive concept, an image processing apparatus includes a pre-processor configured to generate information relating to image positions based on a plurality of Bayer image signals obtained by a plurality of cameras. The image processing apparatus further includes an independent image signal processor (IISP) configured to receive information relating to image positions and to perform a first image signal processing operation for generating first image data from a first one of the plurality of Bayer image signals obtained by a first one of the plurality of cameras. The IISP is further configured to generate image processing information calculated during the first image signal processing operation. The image processing information is position-adjusted based on the information relating to the image positions. The image processing apparatus further includes a dependent image signal processor (DISP) configured to perform a second image signal processing operation for generating second image data from a second one of the plurality of Bayer image signals, obtained by a second one of the plurality of cameras, using the position-adjusted image processing information.

BRIEF DESCRIPTION OF THE DRAWINGS

Exemplary embodiments of the present inventive concept will be more clearly understood by describing in detail exemplary embodiments thereof with reference to the accompanying drawings, in which:

FIG. 8 is a diagram of a process of calculating an edge strength in the preliminary calculation processor of FIG. 4 or FIG. 5 according to an exemplary embodiment of the present inventive concept;

FIGS. 11A, 11B, 11C, 11D, and 11E are diagrams used to illustrate a process of interpolating G and B color values for performing a demosaicing operation in the ISP shown in FIG. 1 according to an exemplary embodiment of the present inventive concept;

FIGS. 12A, 12B, 12C, 12D, and 12E are diagrams used to illustrate a process of interpolating R and B color values for performing a demosaicing operation in the ISP shown in FIG. 1, according to an exemplary embodiment of the present inventive concept;

DETAILED DESCRIPTION OF THE EMBODIMENTS

Figure 1:
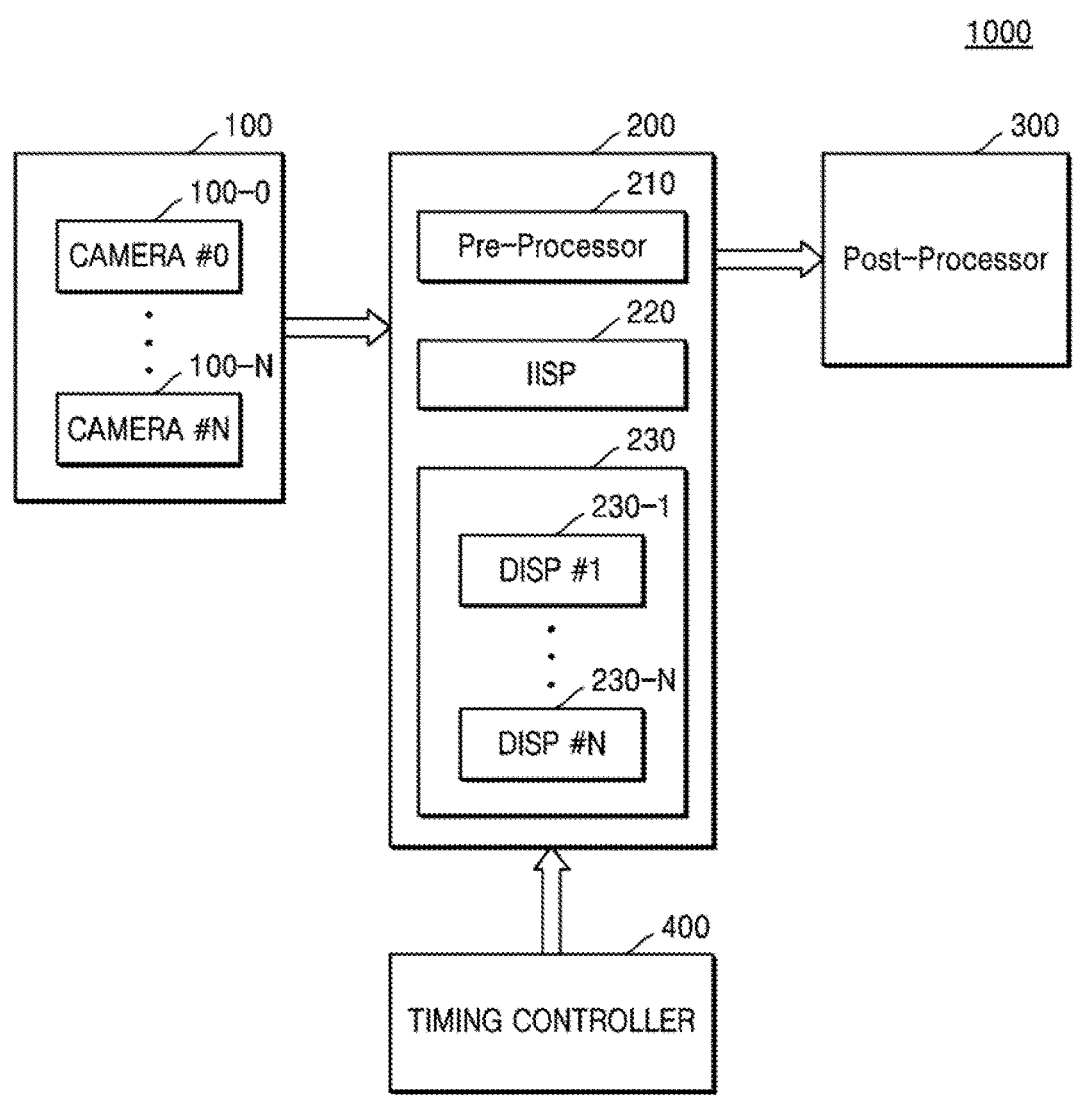
FIG. 1 is a configuration diagram of an image processing system according to an exemplary embodiment of the present inventive concept.

The present inventive concept will now be described more fully hereinafter with reference to the accompanying drawings, in which exemplary embodiments of the inventive concept are shown. Like reference numerals may refer to like elements throughout. In the drawings, the thicknesses of layers and regions may be exaggerated for clarity.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

As used herein, the singular forms "a", "an" and "the" are intended to include the plural forms as well, unless the context clearly indicates otherwise. FIG. 1 is a configuration diagram of an image processing system 1000 according to an exemplary embodiment of the present inventive concept.

Referring to FIG. 1, the image processing system 1000 may include a camera module 100, an ISP 200, a post-processor 300, and a timing controller 400.

The camera module 100 may include a plurality of cameras 100-0 to 100-N(N is an integer equal to or higher than 1). For example, the camera module 100 may include stereo-type cameras or array-type cameras.

Each camera of the plurality of cameras 100-0 to 100-N may include image sensors, which are two-dimensionally arranged in units of pixels. Thus, each camera of the plurality of cameras 100-0 to 100-N may convert an electrical signal corresponding to brightness of light incident to the image sensor into a digital signal and may output the digital signal. Here, the image sensor may include, for example, a Bayer pattern. The digital signal output according to the Bayer pattern may include one color signal for each pixel. For example, a Bayer image signal output by each of the plurality of cameras 100-0 to 100-N may include any one color signal of red (R), green (G), and blue (B) color signals for each pixel. For instance, one of the plurality of cameras 100-0 to 100-N may output an image signal including a green color for a pixel.

The ISP 200 may include a pre-processor 210, an independent image signal processor (IISP) 220, and a dependent image signal processing block 230. The dependent image signal processing block 230 may include one to N dependent image signal processors (DISPs) DISP #1 to DISP #N (230-1 to 230-N). N is an integer equal to or greater than 2. Although the exemplary embodiment shown in FIG. 1 includes one to N dependent signal processors (DISPs), exemplary embodiments of the present inventive concept are not limited thereto. For example, in an exemplary embodiment, the dependent image signal processing block 230 may include only one dependent image signal processor (DISP).

For example, if N is equal to 1, the number of cameras included in the camera module 100 may be 2. Thus, the ISP 200 may include the pre-processor 210, one IISP 220, and one DISP DISP #1 (230-1).

Since each of the IISP 220 and the DISPs DISP #1 to DISP #N (230-1 to 230-N) receives a Bayer image signal including one color signal for each pixel, each of the IISP 220 and the DISPs DISP #1 to DISP #N (230-1 to 230-N) may perform a demosaicing operation correcting the Bayer image signal. For example, each of the IISP 220 and the DISPs DISP #1 to DISP #N (230-1 to 230N) may perform a demosaicing operation for reconstructing the Bayer image signal into three colors. For example, full color images may be reconstructed from incomplete color samples output from an image sensor overlaid with a color filter array (e.g., a Bayer filter) by using the demosaicing operation.

The pre-processor 210 may perform a signal processing operation for generating information regarding image positions based on Bayer images obtained by the plurality of cameras 100-0 to 100-N. In an example, the information regarding the image positions may include image registration information indicating a disparity in an image. In another example, the information of the image position may include depth map information indicating a distance of an image. The information regarding the image positions generated by the pre-processor 210 may be provided to at least one of the IISP 220 or the dependent image signal processing block 230.

The IISP 220 may perform an image signal processing operation for generating image data of RGB format from a Bayer image generated by a target camera, and may generate at least one piece of image processing information calculated during the image signal processing operation. In addition, the target camera may be one of the plurality of cameras 100-0 to 100-N of the camera module 100. In an example, the image processing information may include at least one piece of information predicted or estimated during a process of demosaicing each pixel or information predicted or estimated during a process of denoising each pixel.

The image processing information generated by the IISP 220 may be transmitted to the dependent image signal processing block 230.

Each of the DISPs DISP #1 to DISP #N (230-1 to 230-N) may perform an image signal processing operation for generating image data. For example, the data may be generated in an RGB format from Bayer images. Further, the Bayer images may be generated by the remaining cameras other than the target camera corresponding to the IISP 220 by using the information regarding the image positions and the image processing information generated by the IISP 220. In addition, the remaining cameras are from among the plurality of cameras 100-0 to 100-N of the camera module 100.

Thus, each of the DISPs 230-1 to 230-N may skip a calculation operation, which is performed by the IISP 220 to generate the image processing information. Accordingly, the configuration of the DISPs 230-1 to 230-N may be simplified. Also, the calculation operation for generating the image processing information may be skipped while maintaining the configuration of each of the DISPs 230-1 to 230-N to be the same as the configuration of the IISP 220. As a result, power consumption of the DISPs 230-1 to 230-N may be reduced.

The timing controller 400 may perform an operation of controlling output time points of the pre-processor 210, the IISP 220, and the DISPs 230-1 to 230-N. As a result, since the DISPs 230-1 to 230-N process the Bayer image signal received from the camera module 100 by using the information regarding the image positions generated by the pre-processor 210 and the image processing information generated by the IISP 220, a time point at which image data is output to the post-processor 300 may be adjusted.

The post-processor 300 may process (e.g., post-process) image data output by each of the IISP 220 and the DISPs 230-1 to 230-N. For example, the post-processor 300 may perform a processing (e.g., post-processing) operation, such as a three-dimensional (3D) image processing operation, an image standard conversion operation, or an image correction operation.

Figure 2:
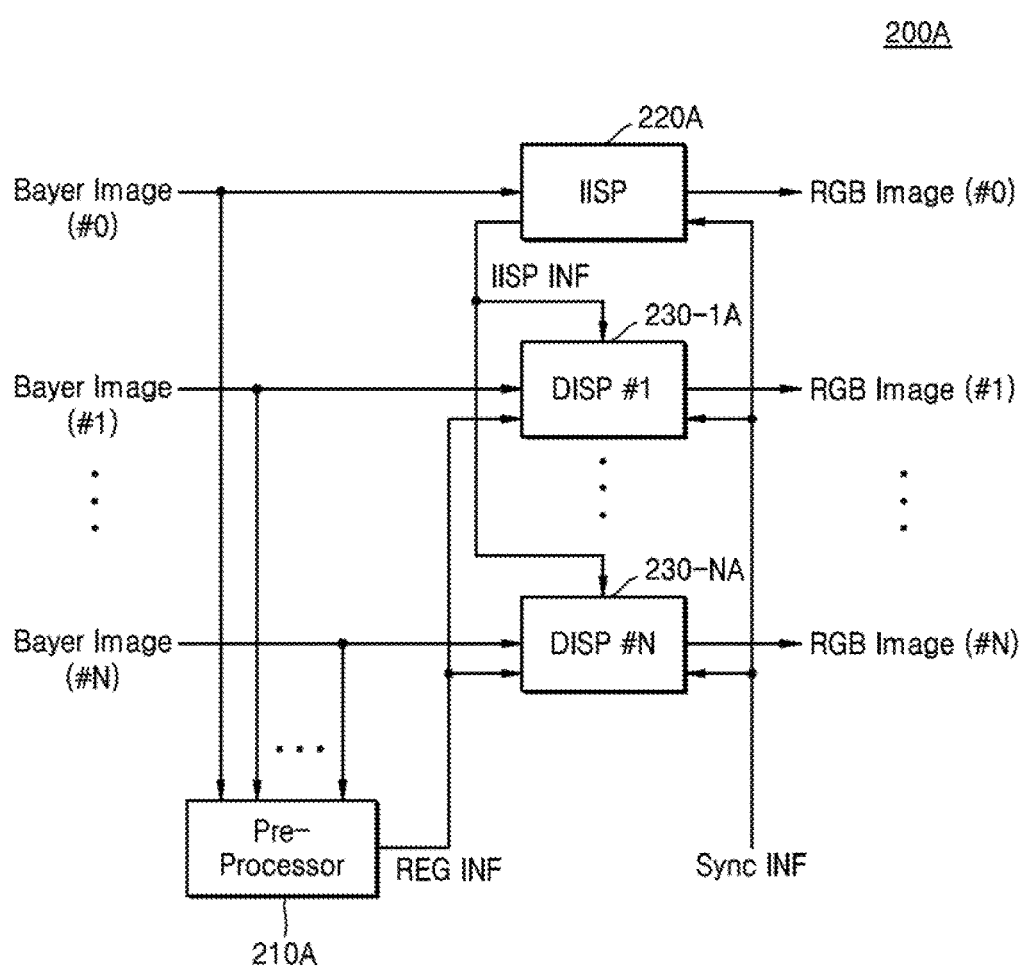
FIG. 2 is a detailed configuration diagram of an example of an image signal processor (ISP) shown in FIG. 1 according to an exemplary embodiment of the present inventive concept.

FIG. 2 is a detailed configuration diagram of an example 200A of the ISP 200 shown in FIG. 1 according an exemplary embodiment of the present inventive concept.

As shown in FIG. 2, the ISP 200A may include a pre-processor 210A, an IISP 220A, and DISPs DISP #1 to DISP #N (230-1A to 230-NA).

In an example, it is assumed that from among the plurality of cameras 100-0 to 100-N shown in FIG. 1, a Bayer image signal #0 obtained by the camera 100-0 is processed by the IISP 220A, and Bayer image signals #1 to #N obtained by the remaining cameras 100-1 to 100-N, respectively, are processed by the DISPs DISP #1 to DISP #N (230-1A to 230-NA). For example, DISP #1 may process Bayer image signal #1, DISP #2 may process Bayer image signal #2, etc.

The pre-processor 210A may perform a signal processing operation for generating information REG INF regarding image positions based on Bayer image signals #0 to #N obtained by the plurality of cameras 100-0 to 100-N. In an example, the information REG INF regarding the image positions may include image registration information indicating a disparity in an image. In another example, the information REG INF regarding the image positions may include depth map information indicating a distance of an image. For example, the information REG INF regarding the image positions may be information indicating a direction in which and the number of pixels by which images based on the respective Bayer image signals #1 to #N are shifted with respect to an image based on the Bayer image signal #0 in each region. In an example, the information REG INF regarding the image positions may be generated in units of regions. In another example, the information REG INF regarding the image positions may be generated in units of objects detected based on edge elements.

Figure 3:
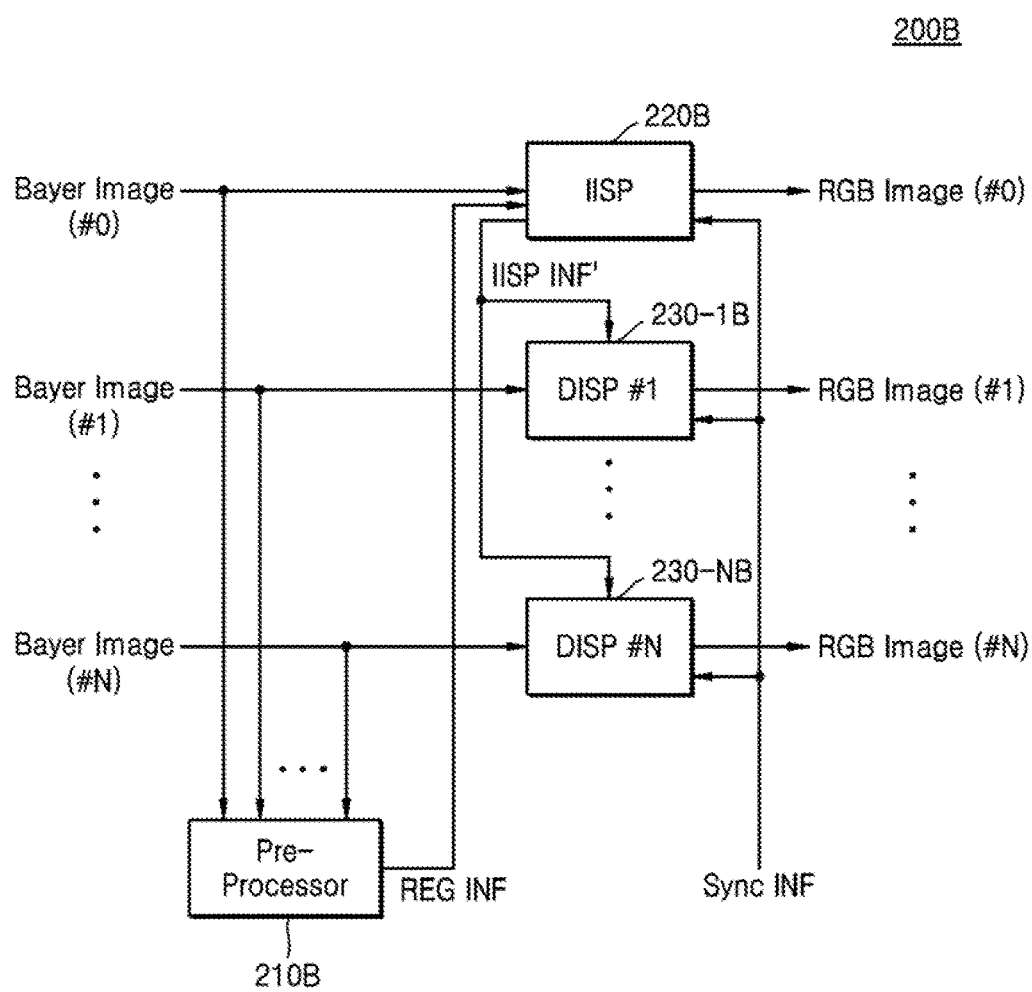
FIG. 3 is a detailed configuration diagram of another example of the ISP shown in FIG. 1 according to an exemplary embodiment of the present inventive concept.
Figure 7A:
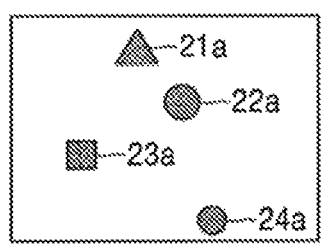
FIGS. 7A, 7B and 7C are diagrams of a process of generating registration information in a pre-processor of FIG. 2 or 3 according to an exemplary embodiment of the present inventive concept.
Figure 7B:
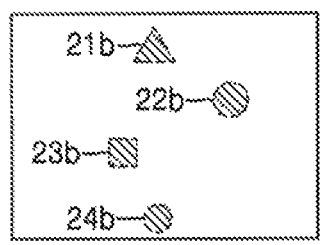
Figure 7C:
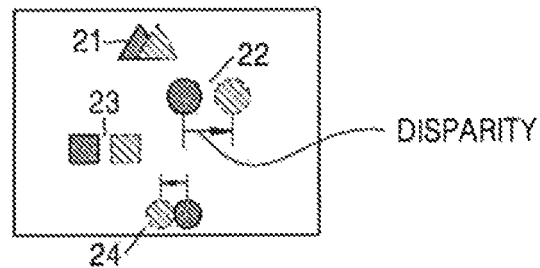

FIGS. 7A, 7B, and 7C are diagrams of a process of generating registration information in the pre-processor 210A or 210B of FIG. 2 or 3 according to an exemplary embodiment of the present inventive concept.

In an example, objects 21a, 22a, 23a, and 24a detected in a Bayer image signal #0 are illustrated in FIG. 7A, and objects 21b, 22b, 23b, and 24b detected in a Bayer image signal #1 are illustrated in FIG. 7B. The objects may be detected by extracting feature points. For example, pixels corresponding to an interfacial line or an edge portion of an image may be extracted as the feature points.

The objects 21a, 22a, 23a, and 24a detected in the Bayer image signal #0 may correspond to the objects 21b, 22b, 23b, and 24b detected in the Bayer image signal #1, respectively. FIGS. 7A, 7B and 7C illustrate, for example, the objects as circular, triangular, or square shapes. In another example, respective objects in actual images may have various shapes, such as people, things, and various background scenes.

FIG. 7C illustrates a state in which an image caused by the Bayer image signal #0 overlaps an image caused by the Bayer image signal #1, according to an exemplary embodiment of the present inventive concept. Referring to FIG. 7C, a disparity in image caused by the Bayer image signal #1 may be obtained based on the image caused by the Bayer image signal #0. In an example, a disparity may be indicated by information regarding the number and direction of shifted pixels.

According to the above-described method, the pre-processor 210A or 210B may calculate the disparity and generate registration information.

Referring back to FIG. 2, the IISP 220A may perform an image signal processing operation for generating image data of RGB format from the Bayer image signal #0. Further, the IISP 220A may generate at least one piece of image processing information IISP INF calculated during the image signal processing operation. In an example, the image processing information may include at least one piece of information predicted or estimated during a process of demosaicing each pixel or a process of denoising each pixel. In an example, the image processing information IISP INF may include edge directionality information. In another example, the image processing information IISP INF may include information regarding an interpolation direction.

In addition, the image processing information IISP INF may include pixel coordinate information. The pixel coordinate information included in the image processing information IISP INF may correspond to pixel coordinate information obtained by performing an image signal processing operation by using the IISP 220A to generate the image processing information IISP INF.

The DISPs 230-1A to 230-NA may perform image signal processing operations for generating image data of RGB format from Bayer images #1 to #N obtained by the plurality of cameras 100-1 to 100-N by using information REG INF regarding image positions and the image processing information IISP INF generated by the IISP 220A.

For example, the DISP 230-1A may position-adjust the pixel coordinate information included in the image processing information IISP INF generated by the IISP 220A, by using the information REG INF regarding the image positions, which is generated based on the Bayer image signal #1 with respect to the Bayer image signal #0. Due to the position adjusting process, positions of objects generated based on the Bayer image signal #0 and the Bayer image signal #1 may be made to correspond to each other.

The DISP 230-1A may perform an image signal processing operation for generating image data of RGB format from the Bayer image signal #1 by using the position-adjusted image processing information. Hereinafter, the position-adjusted image processing information may be referred to as IISP INF'. Thus, the DISP 230-1A may not perform a calculation operation for generating image processing information IISP INF.

Similarly, the DISP 230-NA may position-adjust the pixel coordinate information included in the image processing information IISP INF generated by the IISP 220A by using the information REG INF regarding the image positions, which is generated based on the Bayer image signal #N with respect to the Bayer image signal #0. Due to the position adjusting process, positions of objects generated based on the Bayer image signal #0 and the Bayer image signal #N may be made to correspond to each other. Also, the DISP 230-NA may perform an image signal processing operation for generating image data of RGB format from the Bayer image signal #N by using the position-adjusted image processing information IISP INF'.

Output time points of the IISP 220A and the DISPs 230-1A to 230-NA may be synchronized in response to a synchronous signal Sync INF generated by the timing controller 400. In other words, the timing controller 400 generates the synchronous signal Sync INF to synchronize time points at which image data having an initialized unit size is output from the IISP and the DISPs 230-1A to 230-NA.

FIG. 3 is a detailed configuration diagram of another example 200B of the ISP 200 shown in FIG. 1 according to an exemplary embodiment of the present inventive concept.

As shown in FIG. 3, the ISP 200B may include a pre-processor 210B, an IISP 220B, and DISPs DISP #1 to DISP #N (230-1B to 230-NB).

In an example, it is assumed that a Bayer image signal #0 obtained by the camera 100-0 from among the plurality of cameras 100-0 to 100-N of FIG. 1 is processed by the IISP 220B, and Bayer image signals #1 to #N obtained by the remaining cameras 100-1 to 100-N are processed by the DISPs 230-1B to 230-NB, respectively. For example, a Bayer image signal #1 obtained by camera 100-1 among the plurality of cameras is processed by DISP #1 (230-1B).

Since the pre-processor 210B performs substantially the same operation as the pre-processor 210A described with reference to FIG. 2, repeated descriptions thereof will be omitted.

However, information REG INF regarding image positions, which is generated by the pre-processor 210B, may be provided to the IISP 220B. For example, information REG INF regarding image positions of images based on the respective Bayer image signals #1 to #N with respect to an image based on the Bayer image signal #0 may be provided to the IISP 220B.

The IISP 220B may perform an image signal processing operation for generating image data of RGB format from the Bayer image signal #0, and generate at least one piece of image processing information calculated during the image signal processing operation. The generated image processing information may include, for example, pixel coordinate information. Also, the pixel coordinate information included in the image processing information may be position-adjusted based on the information REG INF regarding the image positions. Accordingly, position-adjusted image processing information IISP INF' for processing the Bayer image signals #1 to #N based on the Bayer image signal #0 may be provided to the DISPs 230-1B to 230-NB, respectively.

The DISP 230-1B may perform an image signal processing operation for generating image data of RGB format from the Bayer image signal #1 by using the position-adjusted image processing information IISP INF' provided by the IISP 220B to correspond to the Bayer image signal #0. Thus, the DISP 230-1B may not perform the calculation operation for generating the image processing information IISP INF.

Similarly, the DISP 230-NB may perform an image signal processing operation for generating the image data having the RGB format from the Bayer image signal #N by using the position-adjusted image processing information IISP INF' provided by the IISP 220B to correspond to the Bayer image signal #0.

Output time points of the IISP 220B and the DISPs 230-1B to 230-NB may be synchronized in response to a synchronous signal Sync INF generated by the timing controller 400.

Figure 4:
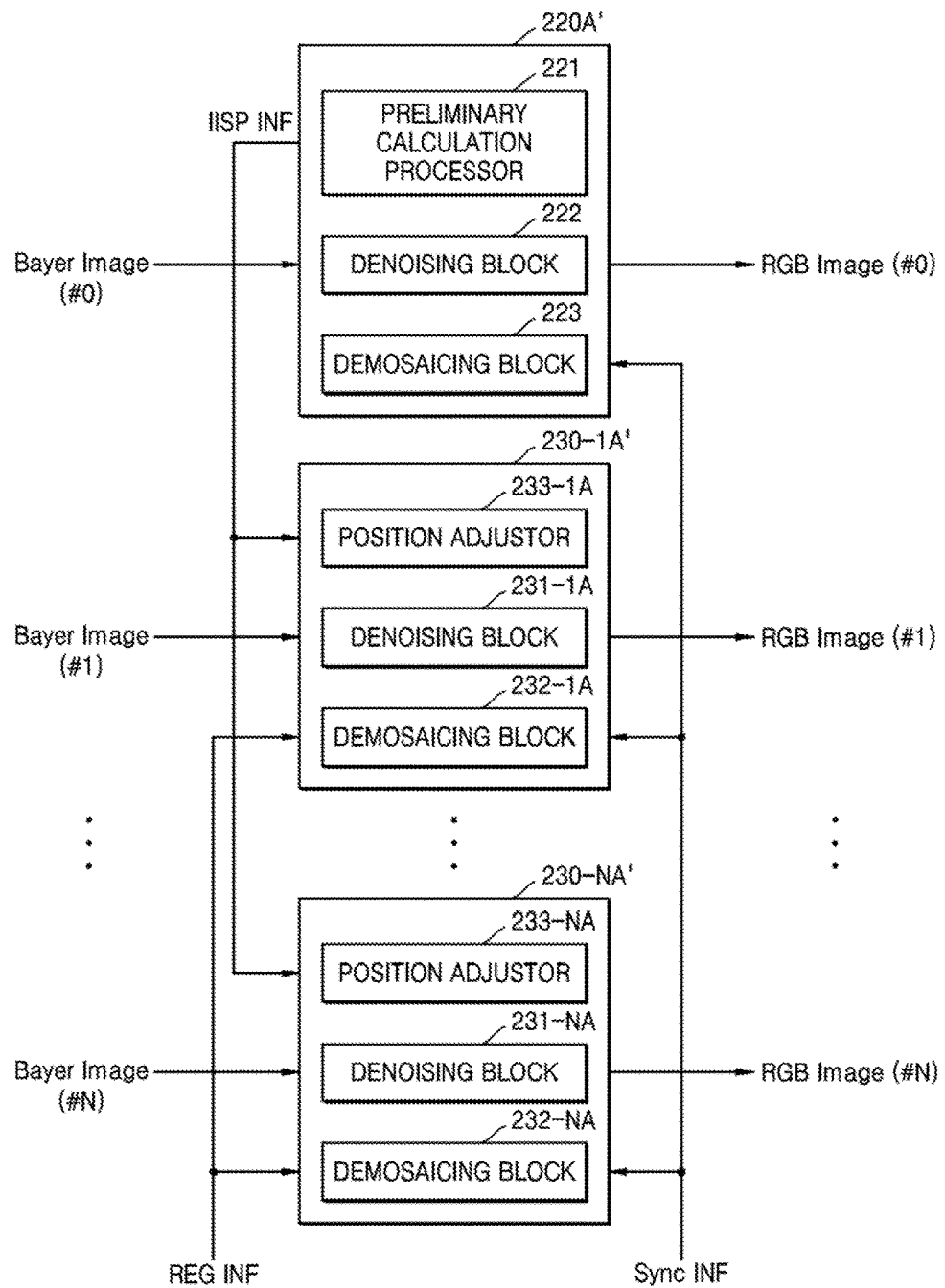
FIG. 4 is a configuration diagram of an independent image signal processor (IISP) and a dependent image signal processor (DISP) shown in FIG. 2 according to an exemplary embodiment of the present inventive concept.

FIG. 4 is a configuration diagram of examples of the IISP 220A and the DISPs 230-1A to 230-NA shown in FIG. 2 according to an exemplary embodiment of the present inventive concept.

As shown in FIG. 4, an IISP 220A' may include a preliminary calculation processor 221, a denoising block 222, and a demosaicing block 223. Also, each of the DISPs 230 may include a position adjustor 233, a denoising block 231, and a demosaicing block 232. Information REG INF regarding image positions of images based on respective Bayer image signals # with respect to an image based on a Bayer image signal #0 may be supplied from the pre-processor 210A to the DISPs 230-1A' to 230-NA' corresponding thereto.

In addition, operations of the IISP 220A' will be described in further detail below.

The preliminary calculation processor 221 may perform part of a denoising calculation process or a demosaicing calculation process. For example, the preliminary calculation processor 221 may perform a calculation operation for determining edge directionality or an interpolation direction, which is used for the denoising calculation process or the demosaicing calculation process.

The preliminary calculation processor 221 may output information, which is predicted or estimated during the part of the denoising calculation process or the demosaicing calculation process performed by the preliminary calculation processor 221, or calculation result information as image processing information IISP INF. For example, the image processing information IISP INF generated by the preliminary calculation processor 221 may include pixel coordinate information.

The denoising block 222 and the demosaicing block 223 may perform a denoising operation and a demosaicing operation, respectively, by using image processing information generated by the preliminary calculation processor 221. In an example, the denoising block 222 may perform an operation of eliminating noise by using a pixel value of a horizontal direction or a vertical direction based on edge directionality information generated by the preliminary calculation processor 221. In addition, the demosaicing block 223 may perform an interpolation operation for a demosaicing operation by using a pixel value of a horizontal direction or a vertical direction based on edge directionality information or interpolation direction information generated by the preliminary calculation processor 221.

Next, operations of the DISPs 230-1A' to 230-NA' will now be described.

The position adjustor 233-1A may position-adjust the pixel coordinate information included in the image processing information IISP INF generated by the IISP 220A', by using information REG INF regarding image positions, which is generated based on the Bayer image signal #1 with respect to the Bayer image signal #0. For example, when the information REG INF regarding the image positions is shifted by 5 pixels rightward, the position adjustor 233-1A may perform a position adjusting process so that the pixel coordinate information included in the image processing information IISP INF may be shifted by 5 pixels rightward. Due to the position adjusting process, positions of objects generated based on the Bayer image signal #0 and the Bayer image signal #1 may be made to correspond to each other.

The denoising block 231-1A and the demosaicing block 232-1A may perform a denoising operation and a demosaicing operation by using position-adjusted image processing information IISP INF'. In an example, the denoising block 231-1A may perform an operation of eliminating noise by using a pixel value obtained in a horizontal direction or a vertical direction, based on edge directionality information included in the position-adjusted image processing information IISP INF'. In addition, the demosaicing block 232-1A may perform an interpolation operation for a demosaicing operation by using the pixel value obtained in the horizontal direction or the vertical direction, based on the edge directionality information included in the position-adjusted image processing information IISP INF' or interpolation direction information.

The remaining DISPs 230-2A' to 230-NA' may operate in substantially the same manner and have substantially the same components as the above-described DISP 230-1A'. For example, a DISP 230-NA' may include the position adjustor 233-NA, the denoising block 231-NA and the demosaicing block 232-NA, all of which are capable of performing substantially the same functions as described above.

Output time points of the IISP 220A' and DISPs 230-1A' to 230-NA' may be synchronized in response to a synchronous signal Sync INF generated by the timing controller 400. In other words, the timing controller 400 may generate the synchronous signal Sync INF to synchronize time points at which image data having an initialized unit size is output from the IISP and the DISPs 230-1A' to 230-NA'.

Figure 5:
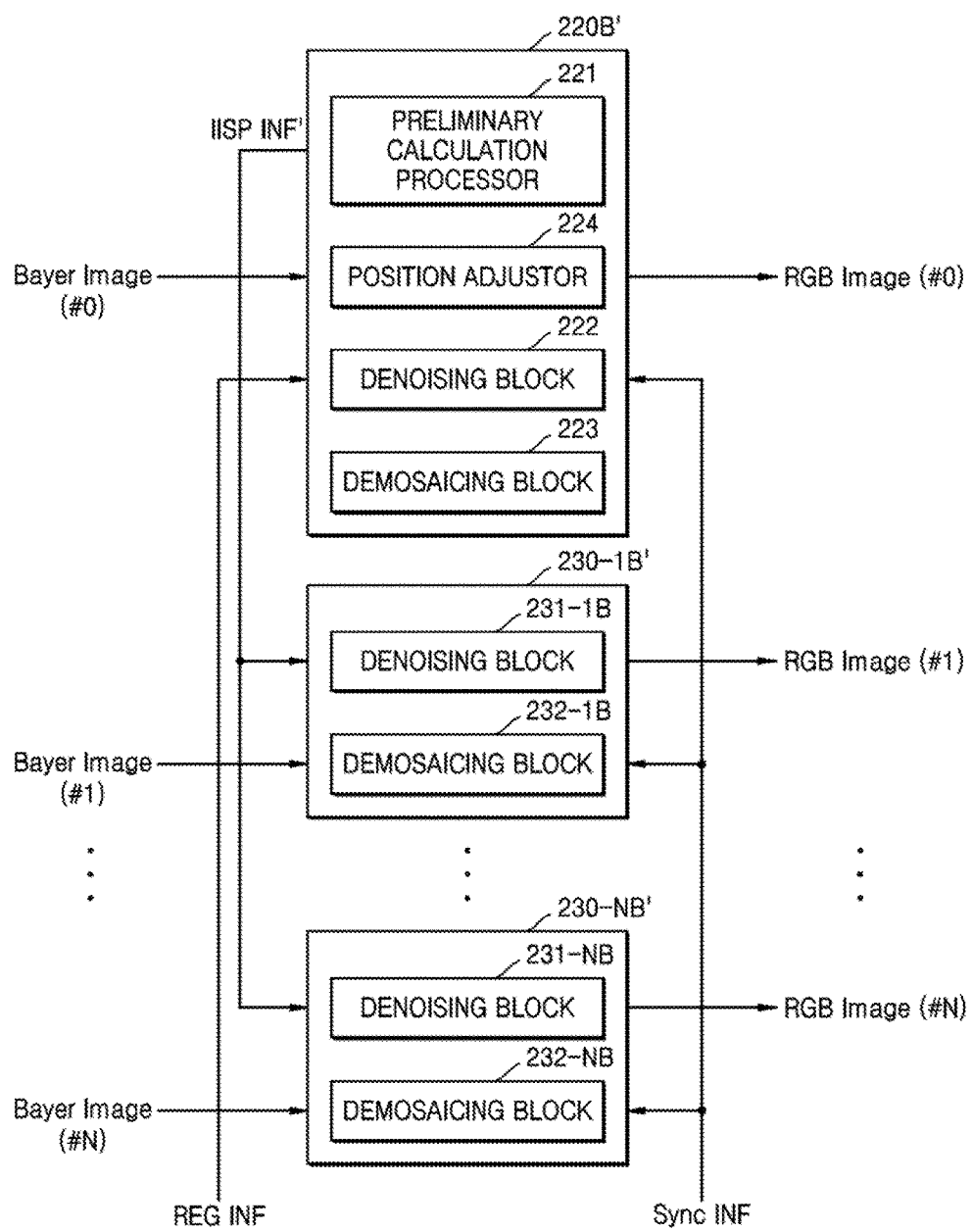
FIG. 5 is a configuration diagram of an IISP and a DISP shown in FIG. 3 according to an exemplary embodiment of the present inventive concept.

FIG. 5 is a diagram of examples of the IISP 220B and the DISPs 230-1B to 230-NB shown in FIG. 3 according to an exemplary embodiment of the present inventive concept.

As shown in FIG. 5, an IISP 220B' may include a preliminary calculation processor 221, a denoising block 222, a demosaicing block 223, and a position adjustor 224. Also, each of the DISPs 230-1B' to 230-NB' may include a denoising block 231-1B and a demosaicing block 232-NB. Information REG INF regarding image positions of images based on respective Bayer image signals #1 to #N with respect to an image based on a Bayer image signal #0 may be supplied from the pre-processor 210B to the IISP 220B'.

In addition, operations of the IISP 220B' will be described in further detail below.

The preliminary calculation processor 221 may perform part of a denoising calculation process or a demosaicing calculation process. For example, the preliminary calculation processor 221 may perform a calculation operation for determining edge directionality or an interpolation direction, which is needed for the denoising calculation process or the demosaicing calculation process.

The preliminary calculation processor 221 may output information, which is predicted or estimated during the part of the denoising calculation process or the demosaicing calculation process performed by the calculation processor 221, or calculation result information as image processing information IISP INF. For example, the image processing information IISP INF generated by the preliminary calculation processor 221 may include pixel coordinate information.

The position adjustor 224 may position-adjust the pixel coordinate information included in the image processing information IISP INF based on the information REG INF regarding the image positions. For example, the position adjustor 224 may position-adjust the pixel coordinate information included in the image processing information IISP INF, by using the information REG INF regarding the image positions, which is generated based on the Bayer image signal #1 with respect to the Bayer image signal #0. The position adjustor 224 may provide the position-adjusted image processing information IISP INF' to the DISP 230-1B'.

In addition, the position adjustor 224 may position-adjust the pixel coordinate information included in the image processing information IISP INF, by the information REG INF regarding the image positions, which is generated based on the Bayer image signal #N with respect to the Bayer image signal #0. The position adjustor 224 may provide the position-adjusted image processing information IISP INF' to the DISP 230-NB'.

Thus, the position-adjusted image processing information ISSP INF' for processing the Bayer image signals #1 to #N with respect to the Bayer image signal #0 may be provided to the DISPs 230-1B' to 230-NB', respectively.

As described with reference to FIG. 4, the denoising block 222 and the demosaicing block 223 may perform a denoising operation and a demosaicing operation by using the image processing information IISP INF generated by the preliminary calculation processor 221.

Next, operations of the DISPs 230-1B' to 230-NB' will be described.

The denoising block 231-1B and the demosaicing block 232-1B may perform a denoising operation and a demosaicing operation by using the position-adjusted image processing information IISP INF' provided by the IISP 220B'. In an example, the denoising block 231-1B may perform an operation of eliminating noise by using a pixel value of a horizontal direction or a vertical direction based on edge directionality information included in the position-adjusted image processing information IISP INF'. In addition, the demosaicing block 232-1B may perform an interpolation operation for a demosaicing operation by using the pixel value of the horizontal direction or the vertical direction based on the edge directionality information included in the position-adjusted image processing information IISP INF' or interpolation direction information.

The remaining DISPs 230-2B' to 230-NB' may operate in substantially the same manner and have substantially the same components as the above-described DISP 230-1B'.

Output time points of the IISP 220B' and the DISPs 230-1B' to 230-NB' may be synchronized in response to a synchronous signal Sync INF generated by the timing controller 400. In other words, the timing controller 400 may generate the synchronous signal Sync INF to synchronize time points at which image data having an initialized unit size is output from the IISP and the DISPs 230-B' to 230-NB'.

Figure 6:
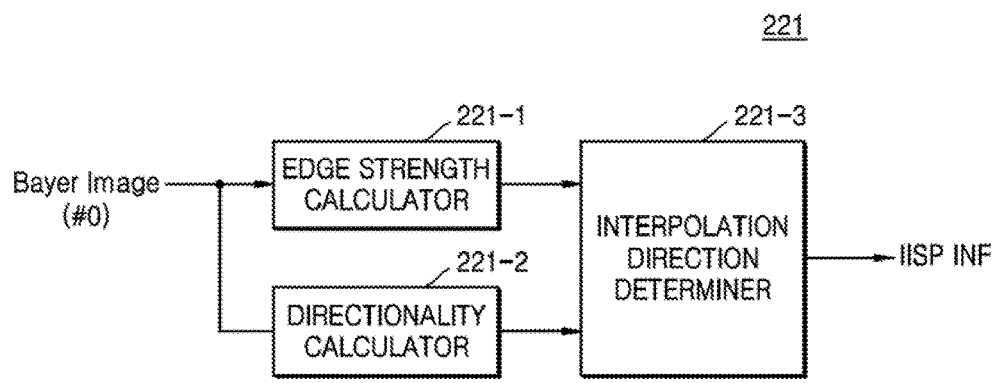
FIG. 6 is a detailed configuration diagram of a preliminary calculation processor shown in FIG. 4 or FIG. 5, according to an exemplary embodiment of the present inventive concept.

FIG. 6 is a detailed configuration diagram of the preliminary calculation processor 221 shown in FIG. 4 or FIG. 5, according to an exemplary embodiment of the present inventive concept.

Referring to FIG. 6, the preliminary calculation processor 221 may include an edge strength calculator 221-1, a directionality calculator 221-2, and an interpolation direction determiner 221-3.

The edge strength calculator 221-1 may calculate an edge strength by using differences in color value between a current pixel and neighboring pixels thereof, and determine whether there is an edge in the vicinity of the current pixel. When there is an edge in an image corresponding to a Bayer image signal #0, there may be differences in color values between pixels located in different regions that are divided from each other along the edge. Accordingly, to determine whether the current pixel belongs to the edge, an edge strength ES may be calculated by calculating differences between a color value of the current pixel and color values of neighboring pixels thereof based on the received Bayer image signal #0. For example, a color value of a G channel from among R, G, and B color channels may be used during the calculation of the edge strength ES. Since the G channel is similar to a luminance element of an image, and R and B channels are similar to chrominance elements of the image, it may be more effectively determined whether there is an edge in the vicinity of the current pixel by using the color value of the G channel as compared with a case in which color values of the R and B channels are used.

FIG. 8 is a diagram used to illustrate a process of calculating an edge strength in the vicinity of a current pixel. In FIG. 8, a letter of the alphabet denotes an element of a color value detected in each pixel, and a number attached to the letter denotes a position of each pixel. For example, Gab denotes a G color value detected in a pixel located in an a-th row and a b-th column. As an additional example, R34 denotes an R color value detected in a pixel located in a $3^{rd}$ row and a $4^{th}$ column, etc.

Referring to FIG. 8, assuming that a position of a current pixel to be interpolated during a mosaicing operation is (3,3), an edge strength ES for determining whether there is an edge in the vicinity of the current may be calculated by using Equation 1:

$$ES=F1\times|G33-G22|+F2\times|G33-G24|+F3\times|G33-G42|+F4\times|G33-G44|+F5\times|G33-G15|+F6\times|G33-G13|+F7\times|G33-G11|+\ldots \quad (1).$$

As can be seen from Equation 1, the edge strength ES may be calculated by using a weighted sum obtained by multiplying a difference in absolute value between the G color value of the current pixel and G color values detected in neighboring pixels thereof by a predetermined weight value. In Equation 1, F1 to F7 may be weight values given to respective pixels. For example, different weight values may be given to the respective pixels according to a distance from the current pixel to each of the neighboring pixels. For example, relatively high weight values may be given to pixels G22, G24, G42, and G44 that are relatively close to the current pixel, while relatively low weight values may be given to pixels G15, G13, G11, G31, G51, G53, G55, and G35 that are relatively far from the current pixel.

As shown in FIG. 8, when the current pixel detects a G color value, an edge strength around the current pixel may be calculated by using Equation 1. However, when the current pixel detects an R or B color value, at least one of the edge strengths calculated in positions of neighboring pixels adjacent to the current pixel may be used, or an average of all or some of the edge strengths calculated in the positions of the neighboring pixels adjacent to the current pixel may be used. For example, assuming that the current pixel is a pixel R34, one of the edge strengths calculated by Equation 1 in the positions of pixels G24, G33, G44, and G35 adjacent to the pixel R34 may be used as the edge strength of the pixel R34. Alternatively, an average of edge strengths of all or selected some of the pixels G24, G33, G44, and G35 adjacent to the current pixel R34 may be obtained and used as the edge strength of the pixel R34. Thus, an edge strength calculated around any one of the pixels G24, G33, G44, and G35 or a value of (G24+G33+G44+G35)/4 may be used as the edge strength of the pixel R34.

In addition, color errors may occur at edges during a color interpolation process. These color errors may occur because R and B color values are not precisely interposed. Accordingly, the color errors may be lessened by interpolating the R and B color values similarly to the G color value at the edges.

Referring back to FIG. 6, the directionality calculator 221-2 may calculate a horizontal-direction color value difference $\Delta H$ and a vertical-direction color value difference $\Delta V$ by using a difference between color values detected in pixels located in the same row and column as the current pixel. Thus, it may be determined whether horizontal edge characteristics or vertical edge characteristics are strong in neighboring pixels of the current pixel so that an appropriate interpolation direction of horizontal and vertical directions may be determined.

Figure 9:
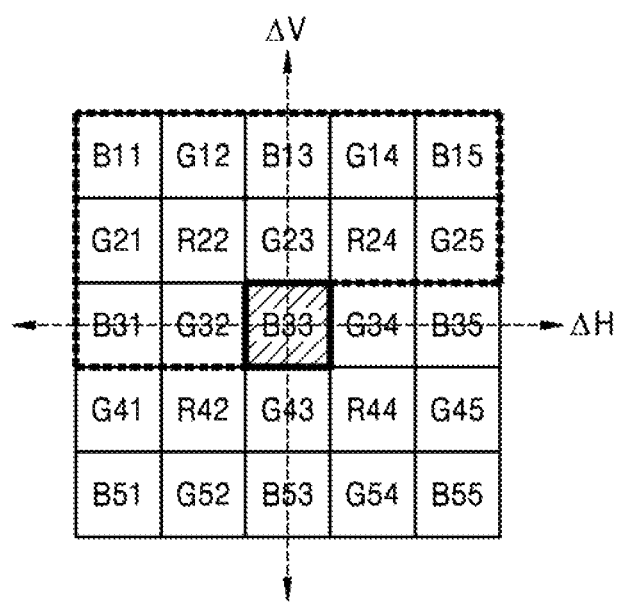
FIG. 9 is a diagram of a process of calculating a horizontal-direction color value difference and a vertical-direction color value difference in the preliminary calculation processor shown in FIG. 4 or FIG. 5 according to an exemplary embodiment of the present inventive concept.

FIG. 9 is a diagram used to illustrate a process of calculating a horizontal color value difference $\Delta H$ and a vertical color value difference $\Delta V$, according to an exemplary embodiment of the present inventive concept. In FIG. 9, it is assumed that a current pixel to be interpolated based on a mosaicing operation is a pixel located in a position (3,3) and configured to detect a B color value B33.

Referring to FIG. 9, a horizontal-direction color value difference $\Delta H$ and a vertical-direction color value difference $\Delta V$ around the current pixel may be calculated as in Equation 2:

$$\Delta H=|G22-G34|+|(B33-B31)+(B33-B35)|$$

$$\Delta V=|G23-G43|+|(B33-B13)+(B33-B53)| \quad (2).$$

In Equation 2, when the horizontal-direction color value difference $\Delta H$ is larger than the vertical-direction color value difference $\Delta V$ (e.g., $\Delta H>\Delta V$), it may be inferred that vertical edge characteristics are strong in the neighboring pixels of the current pixel. Also, when the horizontal-direction color value difference $\Delta H$ is smaller than the vertical-direction color value difference $\Delta V$ (e.g., $\Delta H<\Delta V$), it may be inferred that horizontal edge characteristics are strong in the neighboring pixels of the current pixel.

Referring back to FIG. 6, the interpolation direction determiner 221-3 may determine interpolation directions of color values, which are not detected in the current pixel. The interpolation directions of color values may be determined by using the edge strength ES of the current pixel, which is calculated by the edge strength calculator 221-1. In addition to using the edge strength ES, the horizontal-direction color value differences $\Delta H$ and the vertical-direction color value differences $\Delta V$ of the current pixel and previously interpolated neighboring pixels, which are calculated by the directionality calculator 221-2, may be used to determine the interpolation directions.

For example, when the edge strength ES of the current pixel is below a predetermined threshold value Th1, the interpolation direction determiner 221-3 may determine the vicinity of the current pixel as a flat region having no large difference in pixel value, and may determine an interpolation direction by using only the horizontal-direction color value difference $\Delta H$ and the vertical-direction color value difference $\Delta V$ of the current pixel. When the edge strength ES of the current pixel is below the threshold value Th1 (e.g., ES<Th1) and the horizontal-direction color value difference $\Delta H$ is larger than the vertical-direction color value difference $\Delta V$ (e.g., $\Delta H > \Delta V$), the interpolation direction determiner 221-3 may determine an interpolation direction of a color value, which is not detected in the current pixel, to be a vertical direction. Also, when the edge strength ES of the current pixel is below the threshold value Th1 (e.g., ES<Th1) and the horizontal-direction color value difference $\Delta H$ is smaller than the vertical-direction color value difference $\Delta V$ (e.g., $\Delta H < \Delta V$), the interpolation direction determiner 221-3 may determine the interpolation direction of the color value, which is not detected in the current pixel, to be a horizontal direction.

If the edge strength ES of the current pixel is equal to or higher than the predetermined threshold value Th1, it is highly likely that an edge may be in the vicinity of the current pixel. Thus, the interpolation direction determiner 221-3 may determine the interpolation direction by using the horizontal-direction color value differences $\Delta H$ and the vertical-direction color value differences $\Delta V$ of not only the current pixel, but also neighboring pixels thereof. When it is determined that a strong edge element is included in the vicinity of the current pixel, edge directionality of the neighboring pixels may be considered to determine a precise edge direction.

Figure 10A:
FIGS. 10A and 10B are diagrams used to illustrate a process of using a horizontal-direction color value difference and a vertical-direction color value difference in a neighboring pixel to determine an interpolation direction in the preliminary calculation processor shown in FIG. 4 or FIG. 5, according to an exemplary embodiment of the present inventive concept.
Figure 10B:

FIGS. 10A and 10B are diagrams 800 and 820 used to illustrate a process of using a horizontal-direction color value difference $\Delta H$ and a vertical-direction color value difference $\Delta V$ in a neighboring pixel to determine an interpolation direction, according to an exemplary embodiment of the present inventive concept.

Referring to FIG. 10A, when an edge strength ES of a current pixel exceeds a predetermined threshold value Th1, the interpolation direction determiner 221-3 may subtract a vertical-direction color value difference $\Delta V$ from a horizontal-direction color value difference $\Delta H$ (e.g., $\Delta H - \Delta V$) in each of pixels processed prior to a current pixel 810. Also, the interpolation direction determiner 340 may count the number N of positive differences (e.g., $\Delta H - \Delta V$) of neighboring pixels, compare the number N of the positive differences with a predetermined threshold value Th2, and determine an interpolation direction of a color value, which is not detected in the current pixel, as a vertical direction when the number of neighboring pixels having the positive differences (e.g., $\Delta H - \Delta V$) is equal to or greater than the predetermined threshold value Th2. Thus, when there is a high probability of selecting neighboring pixels in a certain direction during a process of processing previous pixels, the current pixel may be interpolated in the same direction as the neighboring pixels. If the number of neighboring pixels having positive differences (e.g., $\Delta H - \Delta V$) is equal to or less than the predetermined threshold value Th2, the interpolation direction determiner 340 may determine an interpolation direction of a color value, which is not detected in the current pixel, as a horizontal direction. Alternatively, the difference (e.g., $\Delta H - \Delta V$) may be spatially filtered in each of the current pixel and neighboring pixels thereof, and the interpolation direction of the color value, which is not detected in the current pixel, may be determined according to the spatially filtered value Filtered_Value.

For example, assuming that a value $\Delta HV_i$ is equal to a value (e.g., $\Delta H_i - \Delta V_i$) obtained by subtracting the vertical-direction color value difference $\Delta V$ from the horizontal-direction color value difference $\Delta H$ in an i-th pixel position in FIG. 10A, and $F_i$ is a filtering coefficient in an i-th pixel position in FIG. 10B, the spatially filtered value Filtered_Value may be calculated by Equation 3:

$$\text{Filtered\_value} = \sum_{i=1}^{13} (\Delta HV_i \times F_i). \qquad (3)$$

If the number of the current pixel and the neighboring pixels is n and a filtering coefficient $F_i$ is 1/n, the filtered value Filtered_Value denotes an average of the differences (e.g., $\Delta H_i - \Delta V_i$) of the current pixel and the neighboring pixels thereof.

The interpolation direction determiner 221-3 may determine edge directionality in a neighboring pixel by using the filtered value Filtered_Value, and may determine an interpolation direction of a color value, which is not detected in the current pixel, based on the determined edge directionality in the neighboring pixel.

The interpolation direction information determined by the preliminary calculation processor 221 may be output as image processing information IISP INF. Also, edge strength calculation results or directionality calculation results obtained during the calculation process of the preliminary calculation processor 221 may be included in the image processing information IISP INF.

An example of an operation of performing an interpolation operation in the demosaicing block 223 by using the interpolation direction information determined by the preliminary calculation processor 221 will be described.

FIGS. 11A to 11E are diagrams used to illustrate a process of interpolating color values, which are not detected in a current pixel, in the demosaicing block 223 when the current pixel detects an R color value. Although FIGS. 11A to 11E illustrate a case in which the current pixel is an R pixel configured to detect an R color value, the following interpolation method may be similarly applied to a case in which the current pixel is a B pixel configured to detect a B color value.

As shown in FIG. 11A, when a current pixel in a position (3,3) is the R pixel configured to detect only an R color value R33, a G color value G33 and a B color value B33, which are not detected in the current pixel, may be interpolated in any one of a horizontal direction or a vertical direction by using neighboring pixels along the interpolation direction determined by the interpolation direction determiner 221-3.

In addition, when the interpolation direction determined by the interpolation direction determiner 221-3 is the horizontal direction, the G color value G33 in the current pixel may be calculated by Equation 4:

$$G33 = (G32 + G34)/2 + \{(R33 - R31) + (R33 - R35)\}/4 \qquad (4).$$

Figure 11B:
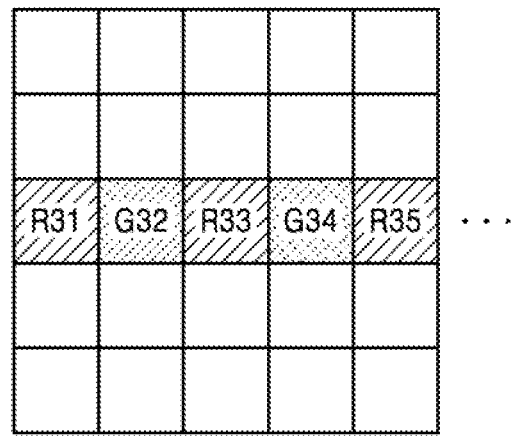

Referring to Equation 4 and FIG. 11B, when the current pixel R33 is the R pixel configured to detect the R color value, the G color value G33 of the current pixel R33 may be calculated by adding an average of G color values, which are detected in neighboring pixels G32 and G34 located in the same row as the current pixel R33, to an average of differences between a color value detected in the current pixel and color values of the same element (e.g., R element), which are detected in neighboring pixels R31 and R35 of the current pixel.

The B color value B33 in the current pixel may be calculated by Equation 5:

$$B33=G33+\{(B22-G22)+(B24-G24)+(B42-G42)+(B44-G44)\}/4 \quad (5).$$

Figure 11C:
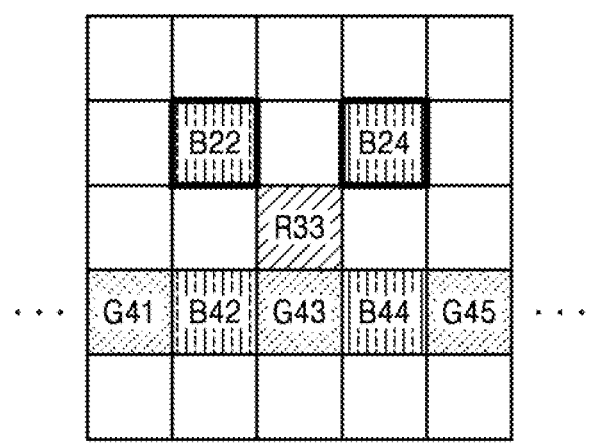

Referring to Equation 5 and FIG. 11C, the B color value B33 of the current pixel may be obtained by adding the G color value G33 of the current pixel to an average of differences between B color values B22, B24, B42, and B44, which are detected in four neighboring pixels located in four diagonal directions of the current pixel, and G color values G22, G24, G42, and G44 interpolated in the four neighboring pixels. Here, the G color values G22, G24, G42, and G44 of the neighboring B pixels located in the diagonal directions of the current pixel may be calculated by averaging G color values located in the same row to correspond to the determined interpolation direction. For example, in FIG. 11C, the G color value G42 in a pixel located in a position (4,2) may be calculated by (G41+G43)/2, and the G color value G44 in a pixel located in a position (4,4) may be calculated by (G43+G45)/2.

When the interpolation direction determined by the interpolation direction determiner 221-3 is the vertical direction, the G color value G33 in the current pixel may be calculated by Equation 6:

$$G33=(G23+G43)/2+\{(R33-R13)+(R33-R53)\}/4 \quad (6).$$

Figure 11D:
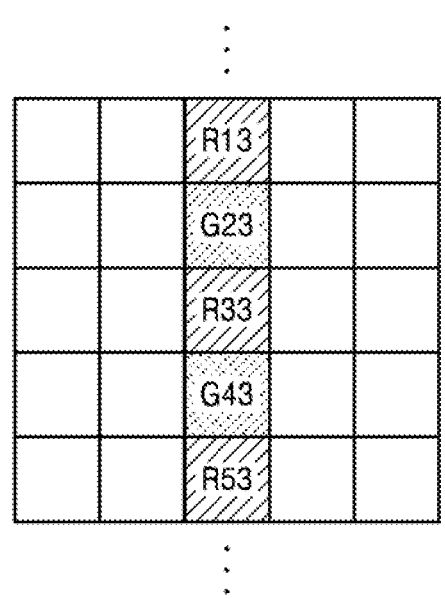

Referring to Equation 6 and FIG. 11D, when a current pixel is an R pixel configured to detect an R color value R33, a G color value G33 of the current pixel may be calculated by adding an average of G color values G23 and G43, which are detected in neighboring pixels located in the same column as the current pixel R33, to an average of differences between the R color value R33 detected in the current pixel and R color values R13 and R53, which are detected in neighboring pixels thereof.

Figure 11E:
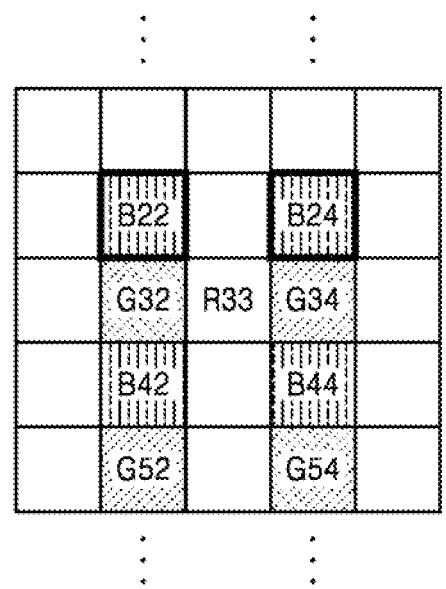

Referring to Equation 5 and FIG. 11E, a B color value B33 of the current pixel may be calculated by adding a G color value G33 interpolated in the current pixel to an average of differences between B color values B22, B24, B42, and B44, which are detected in four neighboring pixels located in four diagonal directions of the current pixel, and G color values G22, G24, G42, and G44 interpolated in the four neighboring pixels. Here, the G color values G22, G24, G42, and G44 of neighboring B pixels located in the diagonal directions may be calculated by averaging G color values located in the same column to correspond to the determined vertical interpolation direction. For example, in FIG. 11E, the G color value G42 in a pixel located in a position (4,2) may be calculated by (G32+G52)/2, and the G color value G44 in a pixel located in a position (4,4) may be calculated by (G34+G54)/2.

FIGS. 12A, 12B, 12C, 12D and 12E are diagrams used to illustrate a process of interpolating R and B color values, which are not detected in a current pixel, when the current pixel detects a G color value, according to an exemplary embodiment of the present inventive concept.

Figure 12A:
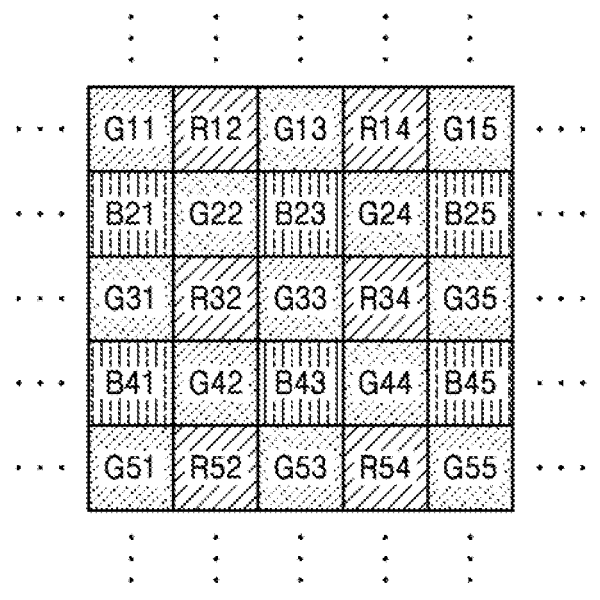

As shown in FIG. 12A, when a current pixel located in a position (3,3) is a G pixel configured to detect only a G color value, an R color value R33 and a B color value B33, which are not detected in the current pixel, may be interpolated in any one of a horizontal direction or a vertical direction by using neighboring pixels along the interpolation direction determined by the interpolation direction determiner 340.

Assuming that the determined interpolation direction is a horizontal direction, neighboring pixels on upper and lower sides of the current pixel detect R color values, a G color value detected in a y-th row and an x-th column is G(y,x), and a weight value that is inversely proportional to an edge strength ES of the current pixel is $\alpha$, an R color value R(y,x) that is not detected in the current pixel may be interpolated by Equation 7:

$$R(y,x)=G(y,x)+\alpha\times\{(R(y-1,x)+R(y+1,x))/2-(G(y-1,x)+(G(y+1,x-1)+G(y+1,x+1))/2\}/2 \quad (7).$$

Figure 12B:
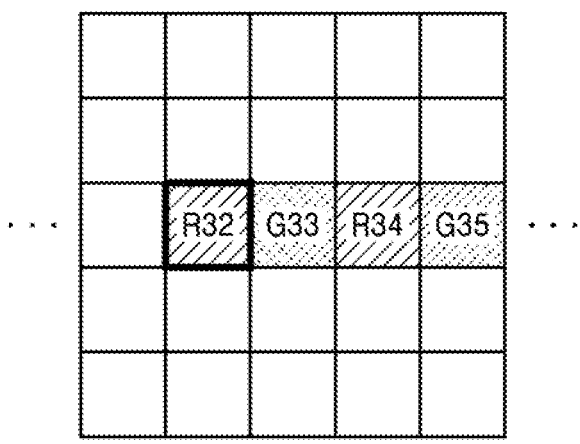

For example, referring to FIG. 12B, when the interpolation direction determined by the interpolation direction determiner 340 is a horizontal direction and neighboring pixels on right and left sides of the current pixel are R pixels, an R color value R33 of the current pixel may be equal to G33+$\alpha$×{(R32+R34)/2−(G32+(G33+G35)/2)/2}/2. In Equation 7, $\alpha$ may be a weight value that is inversely proportional to the edge strength ES of the current pixel. As described above with reference to FIG. 6, the weight value $\alpha$ may approximate an R color value to a G color value in a region having a large edge strength ES, and allow the R color value to be independent of the G color value in a region having a small edge strength ES.

In addition, assuming that the determined interpolation direction is a horizontal direction, neighboring pixels on upper and lower sides of the current pixel detect a B color value, a G color value detected in the current pixel located in a y-th row and an x-th column is G(y,x), and a weight value that is inversely proportional to an edge strength of the current pixel is $\alpha$, a B color value B(y,x) that is not detected in the current pixel may be interpolated by using Equation 8:

$$B(y,x)=G(y,x)+\alpha\times\{(B(y-1,x)+B(y+1,x))/2-(G(y-1,x)+(G(y+1,x-1)+G(y+1,x+1))/2\}/2 \quad (8).$$

Figure 12C:
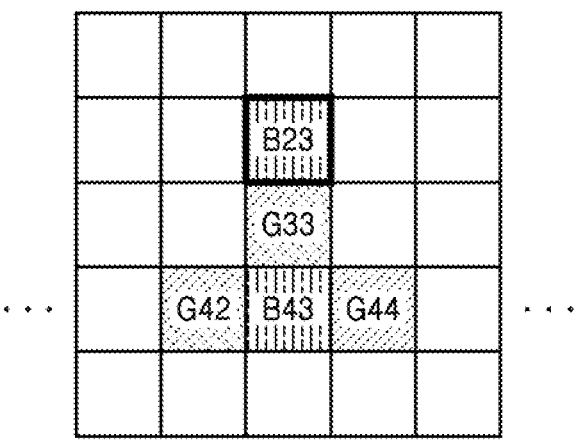

For example, referring to FIG. 12C, assuming that the interpolation direction determined by the interpolation direction determiner 221-3 is a horizontal direction, neighboring pixels on right and left sides of the current pixel are R pixels (illustrated in FIG. 12B), and neighboring pixels on upper and lower sides of the current pixel are B pixels (B23 and B43), a B color value B33 in the current pixel may be equal to G33+$\alpha$×{(B23+B43)/2−(G23+(G42+G44))/2}/2.

In addition, assuming that the interpolation direction determined by the interpolation direction determiner 221-3 is a vertical direction, neighboring pixels on right and left sides of the current pixel detect an R color value, a G color value detected in the current pixel located in a y-th row and an x-th column is G(y,x), and a weight value that is inversely proportional to an edge strength of the current pixel is $\alpha$, the R color value R(y,x) that is not detected in the current pixel may be interpolated by using Equation 9:

$$R(y,x)=G(y,x)+\alpha\times\{(R(y,x-1)+R(y,x+1))/2-(G(y,x-1)+(G(y-1,x+1)+G(y+1,x+1))/2)/2\} \quad (9).$$

Figure 12D:
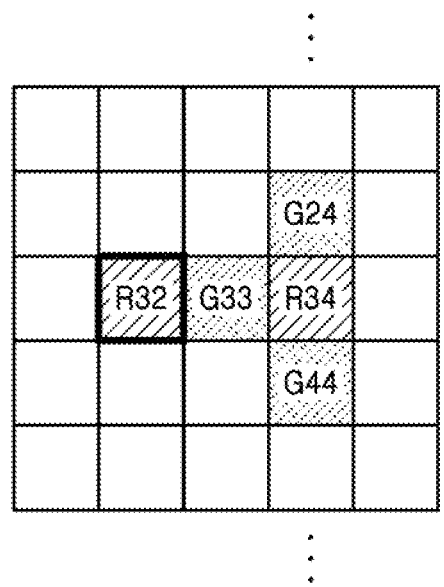

For example, referring to FIG. 12D, the R color value R33 in the current pixel may be equal to G33+$\alpha$×{(R32+R34)/2−(G32+(G24+G44)/2)/2}.

Further, a B color value of the current pixel may be interpolated by using Equation 10:

$$B(y,x)=G(y,x)+\alpha\times\{(B(y-1,x)+B(y+1,x))/2-(G(y-1,x)+(G(y,x)+G(y+2,x))/2)/2\} \quad (10).$$

Figure 12E:
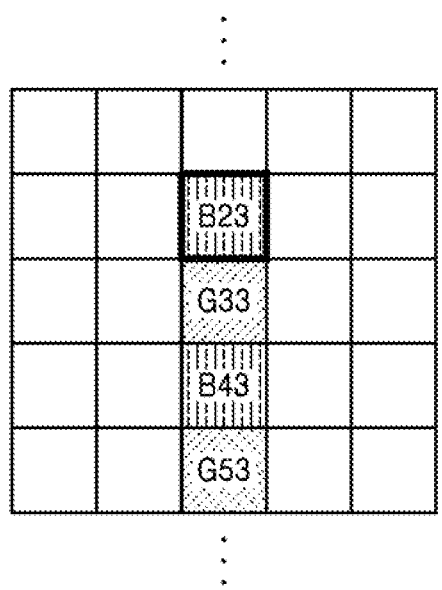

For example, referring to FIG. 12E, a B color value B33 of the current pixel may be equal to G33+$\alpha$×{(B23+B43)/2−(G23+(G33+G53)/2)/2}.

In FIGS. 12A, 12B, 12C, 12D and 12E, it is assumed that the current pixel is a G pixel configured to detect a G color value, neighboring pixels on right and left sides of the current pixel are R pixels, and neighboring pixels on upper and lower sides of the current pixel are B pixels. However, when the current pixel is a G pixel located in a position (2,2) and configured to detect a G color value, neighboring pixels on right and left sides of the current pixel may be B pixels and neighboring pixels on upper and lower sides of the current pixel may be R pixels. In this case, R and B color values, which are not detected in the current pixel, may be interpolated according to a determined interpolation direction as expressed in the following equations.

Initially, assuming that the determined interpolation direction is a horizontal direction, neighboring pixels on right and left sides of a current pixel detect a B color value, a G color value detected by the current pixel located in a y-th row and in an x-th column is G(y,x), and a weight value that is inversely proportional to an edge strength of the current pixel is α, a B color value B(y,x) that is not detected in the current pixel may be calculated by using Equation 11:

$$B(y,x)=G(y,x)+\alpha \times \{(B(y,x-1)+B(y,x+1))/2-(G(y,x-1)+G(y,x)+G(y,x+2))/2\}/2 \quad (11).$$

In this case, an R color value R(y,x) may be calculated by using Equation 12:

$$R(y,x)=G(y,x)+\alpha \times \{(R(y-1,x)+R(y+1,x))/2-(G(y-1,x)+G(y+1,x-1)+G(y+1,x+1))/2\}/2 \quad (12).$$

In addition, assuming that the determined interpolation direction is a vertical direction, neighboring pixels on right and left sides of the current pixel detect a B color value, the G color value detected by the current pixel located in the y-row and in the x-th column is G(y,x), and the weight value that is inversely proportional to the edge strength of the current pixel is α, a B color value B(y,x) that is not detected in the current pixel may be calculated by using Equation 13:

$$B(y,x)=G(y,x)+\alpha \times \{(B(y,x-1)+B(y,x+1))/2-(G(y,x-1)+G(y-1,x+1)+G(y+1,x+1))/2)/2\} \quad (13).$$

In this case, the R color value R(y,x) may be calculated by Equation 14:

$$R(y,x)=G(y,x)+\alpha \times \{(R(y-1,x)+R(y+1,x))/2-G(y-1,x)+G(y,x)+G(y+2,x))/2)/2\} \quad (14).$$

Next, an example of an operation of eliminating noise in the denoising block 222 by using interpolation direction information determined by the preliminary calculation processor 221 will be described.

In an example, when the interpolation direction determined by the preliminary calculator processor 221 is a horizontal direction, the denoising block 222 may obtain a denoised B color value B33' from a B color value B33 of the current pixel located in a position (3,3) in a color pattern of a Bayer image shown in FIG. 9, by using Equation 15:

$$B33'=\{B31+2B33+B35\}/4 \quad (15).$$

In another example, when the interpolation direction determined by the preliminary calculator processor 221 is a vertical direction, the denoising block 222 may obtain a denoised B color value B33' from the B color value B33 of the current located in the position (3,3) in the color pattern of the Bayer image shown in FIG. 9, by using Equation 16:

$$B33'=\{B13+2B33+B53\}/4 \quad (16).$$

The denoising block 222 may perform a denoising operation by applying the same process as described above to other pixels.

In addition, the DISPs 230-1A' to 230-NA' of FIG. 4 or the DISPs 230-1B' to 230-NB' of FIG. 5 may perform a demosaicing operation and a denoising operation by using image processing information IISP INF in substantially the same manner as described above.

Thus, the DISPs 230-1A' to 230-NA' of FIG. 4 or the DISPs 230-1B' to 230-NB' of FIG. 5 may skip a calculation process performed by the preliminary calculation processor 221 shown in FIG. 6.

Figure 13:
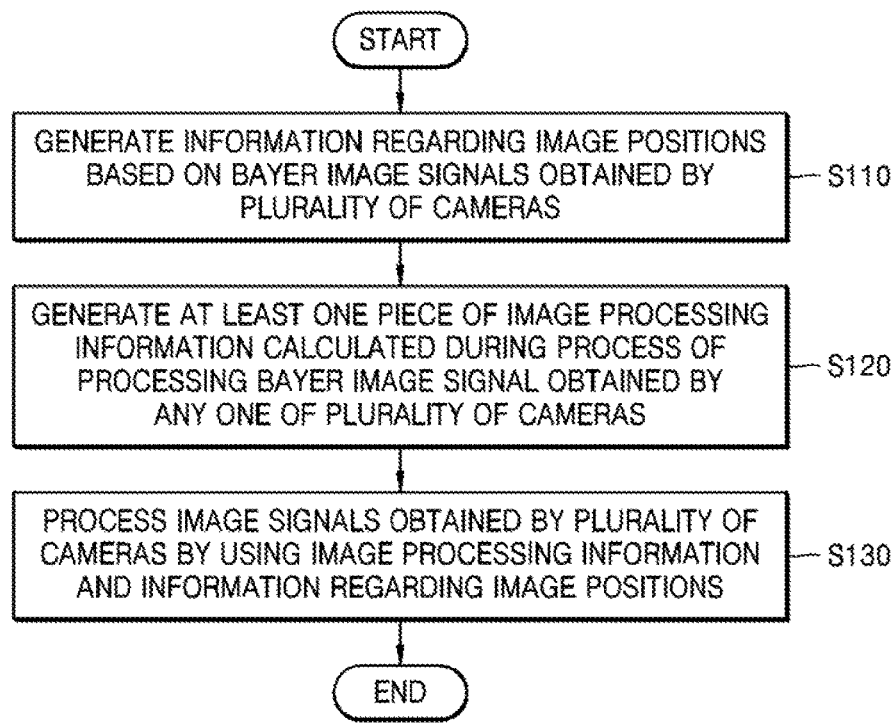
FIG. 13 is a flowchart of a method of processing images according to an exemplary embodiment of the present inventive concept.

FIG. 13 is a flowchart of a method of processing images according to an exemplary embodiment of the present inventive concept. The flowchart of FIG. 13 will be described with reference to the configuration of the image processing system 1000 of FIG. 1.

First, the image processing system 1000 may generate information regarding image positions based on Bayer image signals obtained by a plurality of cameras 100-0 to 100-N (S110). In an example, the pre-processor 210 may perform a signal processing operation for generating the information regarding the image positions based on Bayer images generated by the plurality of cameras 100-0 to 100-N. In an example, the information regarding the image positions may include image registration information indicating a disparity in image. In another example, the information regarding the image positions may include depth map information indicating a distance of image.

Next, the image processing system 1000 may generate at least one piece of image processing information, which is calculated during a process of processing a Bayer image signal obtained by at least one of the plurality of cameras 100-0 to 100-N (S120). In an example, the IISP 220 may perform an image signal processing operation for generating image data of RGB format from a Bayer image obtained from a target camera, which is one of the plurality of cameras 100-0 to 100-N, and generate at least one piece of image processing information calculated during the image signal processing operation. In an example, the image processing information may include at least one piece of information predicted or estimated during a process of demosaicing each pixel, or information predicted or estimated during a process of denoising each pixel.

Next, the image processing system 1000 may perform an image signal processing operation for generating image data of RGB format from the Bayer image signals obtained by the plurality of cameras 100-0 to 100-N by using the image processing information generated in operation S120 and the information regarding the image positions, which is generated in operation S110 (S130). For example, each of the DISPs DISP #1 to DISP #N (230-1 to 230-N) may perform an image signal processing operation for generating image data of RGB format from Bayer images generated by the remaining cameras except the target camera corresponding to the IISP 220, from among the plurality of cameras 100-0 to 100-N of the camera module 100, by using the information regarding the image positions and the image processing information generated by the IISP 220.

Figure 14:
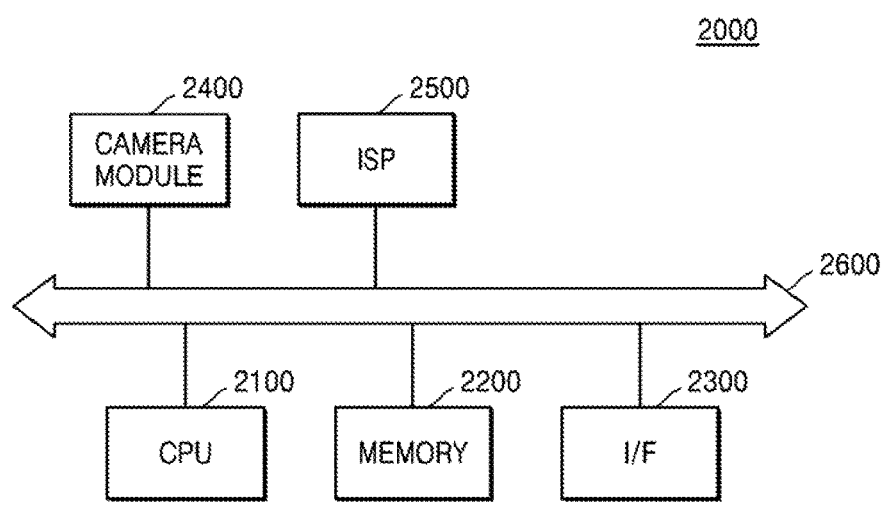
FIG. 14 is a configuration diagram of an example of applying an ISP according to an exemplary embodiment of the present inventive concept to an electronic device.

FIG. 14 is a configuration diagram of an example of applying an ISP according to an exemplary embodiment of the present inventive concept to an electronic device 200.

As shown in FIG. 14, the electronic device 2000 may include a central processing unit (CPU) 2100, a memory 2200, a device interface 2300, a camera module 2400, an ISP 2500, and a bus 2600.

The camera module 2400 may be embodied by the camera module 100 shown in FIG. 1. The ISP 2500 may include the ISP 200 shown in FIG. 1. Also, the ISP 2500 may further include the post-processor 300 shown in FIG. 1. Furthermore, hardware and software configured to perform functions of the timing controller 400 shown in FIG. 1 may be included in the CPU 2100.

The CPU 2100 may generally perform an operation of controlling the electronic device 2000. A program code and various pieces of information required for operations of the electronic device 2000 may be stored in the memory 2200.

The device interface 2300 may communicate data with an apparatus that is connected to the electronic device 2000 by wire or wirelessly. In an example, the device interface 2300 may be connected to a display device and perform an operation of transmitting a signal output by the ISP 2500 to the display device. A bus 2600 may transmit information between elements of the electronic device 2000.

Figure 15:
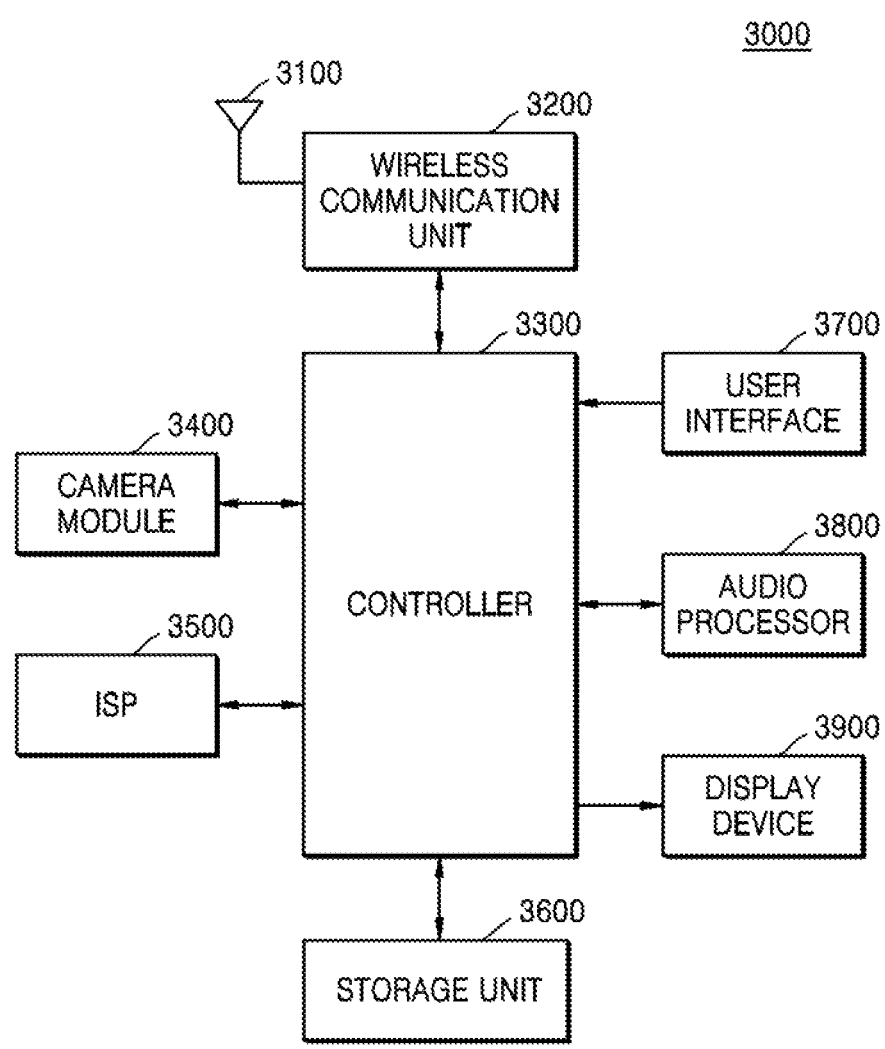
FIG. 15 is a configuration diagram of an example of applying an ISP according to an exemplary embodiment of the present inventive concept to a mobile terminal.

FIG. 15 is a configuration diagram of an example of applying an ISP according to an exemplary embodiment of the present inventive concept to a mobile terminal 3000.

Referring to FIG. 15, the mobile terminal 3000 may include an antenna 3100, a wireless communication unit 3200, a controller 3300, a camera module 3400, an ISP 3500, a storage unit 3600, a user interface 3700, an audio processor 3800, and a display device 3900.

The camera module 3400 may be embodied by the camera module 100 shown in FIG. 1. The ISP 3500 may include the ISP 200 shown in FIG. 1. Also, the ISP 3500 may further include the post-processor 300 shown in FIG. 1. Furthermore, hardware and software configured to perform functions of the timing controller 400 shown in FIG. 1 may be included in the controller 3300.

The antenna 3100 may serve to radiate or receive radio waves to wirelessly transmit or receive signals.

The wireless communication unit 3200 may perform a signal processing operation for operations of transmitting and receiving data to and from a wireless channel through the antenna 3100.

The controller 3300 may control general operations of the mobile terminal 3000. In an example, the controller 3300 may control the flow of signals between elements of the mobile terminal 3000, and perform an operation of processing data.

The user interface 3700 may receive a manipulation signal for controlling the mobile terminal 3000 from a user and transmit the manipulation signal to the controller 3300.

The audio processor 3800 may include a coder/decoder (codec), which may include a data codec configured to process packet data and an audio codec configured to process an audio signal (e.g., voice). During telephone conversation, the audio processor 3800 may convert digital audio data, which is received via the wireless communication unit 3200, into an analog audio signal via the audio codec and output the analog audio signal to a speaker. Further, the audio processor 3800 may convert an analog audio signal, which is input from a microphone, into digital audio data via the audio codec and transmit the digital audio data to the controller 3300.

The display device 3900 may display the image data output by the controller 3300 on a screen. For example, a liquid crystal display (LCD) device may be applied to the display device 3900. For example, the display device 3900 may receive image data output by the ISP 3500 and display the image data on the screen. Program codes and various pieces of information required for operations of the mobile terminal 3000 may be stored in the storage unit 3600.

As is traditional in the field of the inventive concepts, embodiments are described, and illustrated in the drawings, in terms of functional blocks, units and/or modules. Those skilled in the art will appreciate that these blocks (e.g., a denoising block and a demosaicing block), units and/or modules (e.g., a wireless communication unit, storage unit, and a camera module) are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

While the inventive concept has been particularly shown and described with reference to exemplary embodiments of the present inventive concept thereof, it will be understood that various changes in form and details may be made therein without departing from the spirit and scope of the following claims.

What is claimed is:

1. An image processing apparatus, comprising:
   a pre-processor configured to generate information relating to image positions based on a plurality of Bayer image signals obtained by a plurality of cameras;
   an independent image signal processor (IISP) configured to perform a first image signal processing operation for generating first image data of an RGB format from a first one of the plurality of Bayer image signals obtained by a first one of the plurality of cameras, and generate image processing information calculated during the first image signal processing operation; and
   a dependent image signal processor (DISP) configured to perform a second image signal processing operation for generating second image data of the RGB format from a second one of the plurality of Bayer image signals obtained by a second one of the plurality of cameras using the image processing information and the information relating to the image positions.

2. The image processing apparatus of claim 1, wherein the information relating to the image positions comprises image registration information indicating an image disparity, wherein the image disparity indicates differences in the plurality of Bayer image signals.

3. The image processing apparatus of claim 1, wherein the plurality of cameras comprise stereo-type or array-type camera devices.

4. The image processing apparatus of claim 1, wherein the image processing information comprises information predicted or estimated during at least one of a denoising operation and a demosaicing operation.

5. The image processing apparatus of claim 4, wherein the image processing information comprises interpolation direction information obtained during the demosaicing operation.

6. The image processing apparatus of claim 1, wherein the IISP comprises:

a preliminary calculation processor configured to perform a partial calculation operation for denoising the first Bayer image signal or demosaicing the first Bayer image signal, and to generate the image processing information based on at least one of information predicted or estimated during the partial calculation operation, wherein the IISP is configured to perform a color interpolation operation using the image processing information.

7. The image processing apparatus of claim 6, wherein the IISP is configured to eliminate noise using the image processing information.

8. The image processing apparatus of claim 1, wherein the image processing information comprises information predicted or estimated during the first image signal processing operation and pixel coordinate information, and the image processing information is position-adjusted using the information relating to the image positions.

9. The image processing apparatus of claim 8, wherein the image processing information is position-adjusted by the IISP or the DISP.

10. The image processing apparatus of claim 1, wherein the DISP skips a calculation operation for generating the image processing information.

11. An image processing system, comprising:
a plurality of cameras configured to generate a plurality of Bayer images;
a pre-processor configured to generate information relating to image positions based on a plurality of Bayer image signals generated by the plurality of cameras;
an independent image signal processor (IISP) configured to perform a first image signal processing operation for generating first image data of an RGB format from a first one of the plurality of Bayer image signals generated by a first camera from among the plurality of cameras, and to generate image processing information calculated during the first image signal processing operation;
a dependent image signal processor (DISP) configured to perform a second image signal processing operation for generating second image data of the RGB format from a second one of the plurality of Bayer image signals generated by a second camera from among the plurality of cameras using the image processing information and the information relating to the image positions;
a timing controller configured to control output time points of the pre-processor, the IISP, and the DISP; and
a post-processor configured to post-process the first image data generated by the IISP and the second image data generated by the DISP.

12. The image processing system of claim 11, wherein the timing controller generates a synchronous signal to synchronize time points at which image data having an initialized unit size is output from the IISP and the DISP.

13. The image processing system of claim 11, wherein the information relating to the image positions comprises image registration information indicating an image disparity, wherein the image disparity indicates differences in the plurality of Bayer image signals.

14. The image processing system of claim 11, wherein the image processing information comprises information predicted or estimated during a process of demosaicing each pixel or information predicted or estimated during a process of denoising each pixel.

15. The image processing system of claim 11, wherein the DISP skips a calculation process for generating the image processing information.

16. An image processing apparatus, comprising:
a pre-processor configured to generate information relating to image positions based on a plurality of Bayer image signals obtained by a plurality of cameras;
an independent image signal processor (IISP) configured to receive information relating to image positions and to perform a first image signal processing operation for generating first image data from a first one of the plurality of Bayer image signals obtained by a first one of the plurality of cameras, and generate image processing information calculated during the first image signal processing operation, wherein the image processing information is position-adjusted based on the information relating to the image positions; and
a dependent image signal processor (DISP) configured to perform a second image signal processing operation for generating second image data from a second one of the plurality of Bayer image signals, obtained by a second one of the plurality of cameras, using the position-adjusted image processing information.

17. The image processing apparatus of claim 16, wherein the image processing information includes pixel coordinate information that is position-adjustable based on the information relating to the image positions.

18. The image processing apparatus of claim 16, wherein the IISP is configured to eliminate noise using the image processing information, and to perform a color interpolation operation using the image processing information.

19. The image processing apparatus of claim 16, wherein the IISP comprises a preliminary calculation processor configured to perform a partial calculation operation for denoising the first Bayer image signal or demosaicing the first Bayer image signal, and to generate the image processing information based on at least one of information predicted or estimated during the partial calculation operation.

20. The image processing apparatus of claim 16, wherein the information relating to the image positions comprises at least one of image registration information and depth map information.

* * * * *